(12) United States Patent
Aitken

(10) Patent No.: US 6,188,446 B1
(45) Date of Patent: Feb. 13, 2001

(54) DUAL DIPLEXER COMBINING DEVICE AND TELEVISION BROADCAST TRANSMISSION SYSTEM USING SAME

(75) Inventor: Mark Aitken, Southwick, MA (US)

(73) Assignee: Thomcast Communications, Inc., Southwick, MA (US)

( * ) Notice: Under 35 U.S.C. 154(b), the term of this patent shall be extended for 0 days.

(21) Appl. No.: 09/064,859

(22) Filed: Apr. 23, 1998

(51) Int. Cl.[7] .................................................. H04N 5/38
(52) U.S. Cl. ............................ 348/723; 348/21; 370/343
(58) Field of Search .......................... 348/21, 723, 724; 370/297, 343; 342/55; 333/134, 135, 202, 208, 211, 212; H04N 5/38

(56) References Cited

U.S. PATENT DOCUMENTS

| | | | |
|---|---|---|---|
| 4,240,155 | * 12/1980 | Vaughan | 370/297 |
| 4,491,871 | * 1/1985 | Schmitz et al. | |
| 5,774,193 | * 6/1998 | Vaughan | 348/723 |
| 5,943,012 | * 8/1999 | Sinclair | 342/373 |

FOREIGN PATENT DOCUMENTS

| | | | |
|---|---|---|---|
| 0869670 | * 10/1998 | (EP) | H04N/5/38 |
| 1-71275 | * 3/1989 | (JP) | H04N/5/38 |
| 6-188607 | * 7/1994 | (JP) | H04N/5/38 |

* cited by examiner

Primary Examiner—David E. Harvey
(74) Attorney, Agent, or Firm—Rothwell, Figg, Ernst & Manbeck

(57) ABSTRACT

A method and apparatus are provided for allowing two different television signals to be combined and sent to a common propagation device, such as a tower antenna. The apparatus utilizes a number of appropriately loaded hybrids, hybrid waveguide junctions, or other appropriate equivalent devices to combine the signals in such manner that there is a minimum of intersignal interference or distortion. The apparatus utilizes bandpass/reject filters and notch filters in conjunction with the hybrids to achieve the desired results. A television broadcast system using the hybrid combining apparatus is also provided.

18 Claims, 3 Drawing Sheets

DUAL DIPLEXER COMBINING DEVICE AND TELEVISION BROADCAST TRANSMISSION SYSTEM USING SAME

BACKGROUND OF THE INVENTION

1. Field of the Invention

The present invention relates generally to transmission of radio frequency (RF) signal waves and specifically to the combination of different RF signals into a common transmission line, such as a waveguide, for application to a common propagating device such as an antenna for further transmission of the electromagnetic wave.

2. Background and Related Art

In electronic apparatus concerned with amplification and transmission of electromagnetic energy, the energy is usually transferred from one component of the system to another in the form of current through electrical conductors such as wire or cable. At very high frequencies and high power, the transfer of electrical energy through current carrying conductors becomes inefficient and impractical. Instead of transferring electrical energy as current through conductors, the high frequency high power energy can be transmitted by electromagnetic waves constrained within a guiding structure or waveguide. The transmission of energy by waveguide is carried out by radiating the energy, in the form of electromagnetic waves, into the inside of the waveguide structure through various coupling mechanisms such as probes, loops, crossbars and the like. This same energy may be extracted from the waveguide by a similar coupling mechanism at another location on the waveguide. Where the energy is in the form of current, conveyed in multiple conductors, devices such as coaxial cross-coupled hybrids may be used.

Many applications exist where it is desired to combine signals of various frequencies into a common transmission line structure. One example of such an application is in the field of microwave communications. One requirement of such combination is that the different signals must not improperly interfere with each other.

In this regard, various tuned filtering devices have been used in the prior art. However, due to the non-ideal nature of some of such devices, unwanted distortions and losses are inevitably introduced into the frequency bands of the different signals, causing the signals to be degraded in quality.

One particular application for combining electromagnetic signal waves has arisen with the advent of digital television (DTV). Broadcasters who wish to provide DTV service still must provide broadcast signals in the conventional NTSC (National Television Systems Committee) format to accommodate viewers with conventional NTSC television receivers. Absent a feasible and efficient way to combine the DTV signal and the NTSC signal for transmission by a common broadcast antenna (possibly on adjacent frequency channels) without causing unacceptable interference, interaction and distortion of the signals, this will require some broadcasters to build additional antennae and towers to carry their DTV signals. This represents a very expensive and undesirable proposition.

Under present NTSC broadcast allocations, each active channel of 6 MHz bandwidth is separated from other channels by one or more 6 MHz wide inactive channels, in order to prevent interchannel interference between signals. Because of the limited nature of the electromagnetic spectrum and the requirement for broadcasters to continue to provide conventional NTSC signals to serve viewers who do not own DTV receivers, DTV signals will, in some cases, be broadcast on currently inactive 6 MHz wide channels adjacent to the upper side of current NTSC broadcasting channels.

Various techniques have been proposed to provide an acceptable combination of analog (i.e., NTSC) and digital DTV signals on adjacent broadcast channel allocations to meet this requirement. Proposed combiners utilizing wideband and other LC filters unavoidably introduce large signal phase delay and amplitude artifacts which are at best difficult to correct in order to reestablish the original signal purity specifications of the transmitter. The difficulty arises from the fact that a broadband filter is required for each signal having a "cliff" response directly at the common band edge between the combined signals, because there is virtually no guard band between the two signals. Such LC filters have much difficulty achieving good performance characteristics under such constraints, and the need for stability over varying environmental conditions (mainly temperature) adds further to the difficulty in designing acceptable combiners using these LC filters.

Accordingly, there exists a need in the art to enable the combination of signals of different frequencies on adjacent broadcast channels without mutual interference and distortion.

SUMMARY OF THE INVENTION

The present invention provides a solution to the shortcomings of the prior art as discussed above.

In particular, the present invention provides apparatus for combining first and second television signals for propagation on a common propagating device, comprising a first hybrid which receives the first television signal at a first port thereof, divides the first television signal into two divided signals and outputs the divided first television signals at second and third ports thereof, a second hybrid which receives the divided first television signals at first and second ports thereof, receives a first component of the second television signal at a third port thereof, recombines the divided first television signals into a single signal and outputs a combination of said the television signal and the first component of the second television signal at a fourth port thereof, a third hybrid which receives the combination at a first port thereof, divides the combination into two divided combination signals and outputs the divided combination signals at second and third ports thereof, and a fourth hybrid which receives the divided combination signals at first and second ports thereof, receives a second component of the second television signal at a third port thereof, recombines the divided combination signals into a single combination signal and outputs a combination of the single combination signal and the second component of the second television signal at a fourth port thereof.

According to another aspect of the invention, a television broadcast transmission system is provided, which includes a first transmitter for developing a first television signal, a second transmitter for developing first and second components of a second television signal, a dual hybrid combining device for combining the first television signal with the first component to provide a first combined signal, combining the first combined signal with the second component to provide a second combined signal, and outputting the second combined signal, and a common propagation device for receiving the second combined signal and propagating the second combined signal through the atmosphere.

DESCRIPTION OF THE DRAWINGS

The invention will be described in detail with reference to the following drawings in which.

DETAILED DESCRIPTION OF PREFERRED EMBODIMENTS

Figure 1:
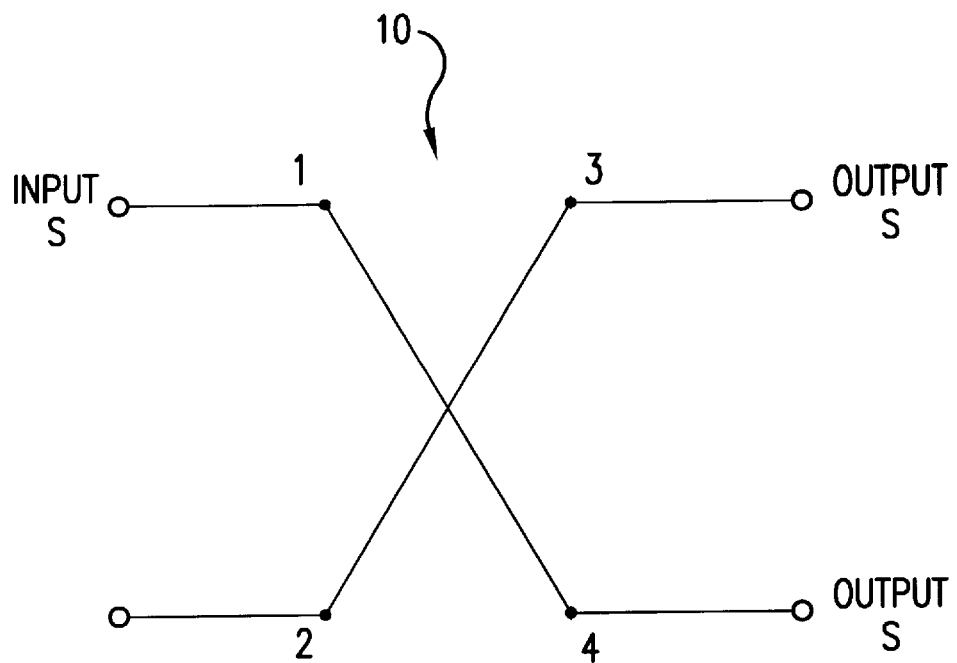
FIG. 1 is a schematic diagram of a hybrid junction used in connection with the present invention.

FIG. 1 is a schematic representation of a conventional device 10 known alternatively as a hybrid, hybrid junction, "magic tee," or cross-coupled hybrid of the coaxial type. A hybrid junction is generally a four port waveguide structure having four terminals or ports so arranged that, when properly terminated in external impedances, couples a signal input at either of ports 1 and 2 to ports 3 and 4, but not to the other of ports 1 and 2. Similarly, a signal input at either of ports 3 or 4 will be coupled to ports 1 and 2 (having proper load impedances) but not to the other of ports 3 and 4. In particular, a signal S entering hybrid 10 at port 1 will divide and emerge from the two adjacent ports 3 and 4 as output signals S, assuming that ports 3 and 4 are terminated with equal appropriate characteristic impedances, but will be unable to reach the opposite port 2. Conversely, if the divided signals encounter the equivalent of short circuits (appropriately phased) at both output ports 3 and 4, the signals will be reflected back into the hybrid junction and will appear recombined as a single signal at port 2. Examples of known hybrid junctions are disclosed, for example, in U.S. Pat. Nos. 3,818,385 and 4,413,242. The term "hybrid" as used hereinafter shall include a hybrid, hybrid junction, or other equivalent coupler and/or splitter device as known in the art.

Figure 2:
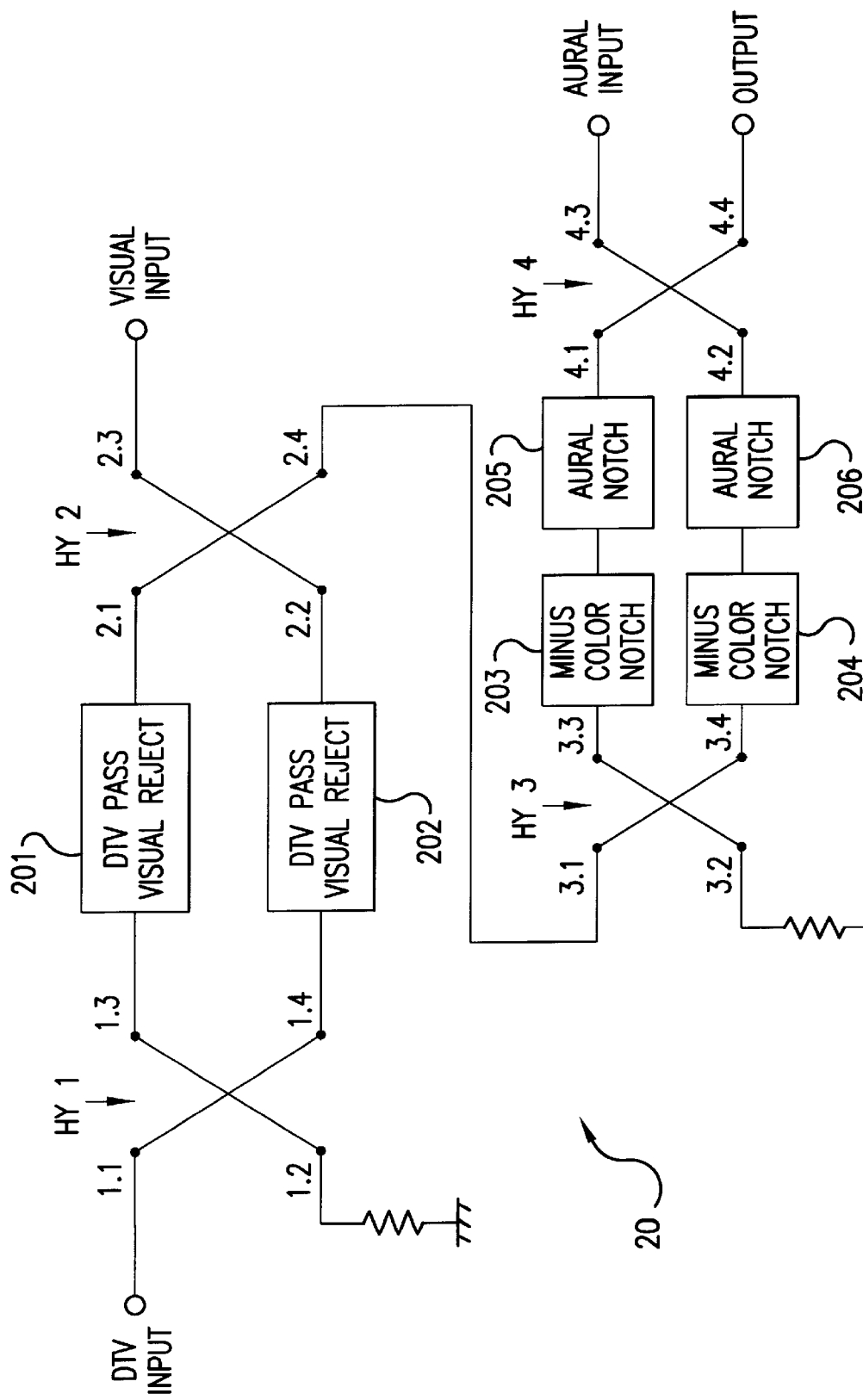
FIG. 2 is a block diagram of a dual diplexer hybrid combiner according to one preferred embodiment of the invention.
Figure 4:
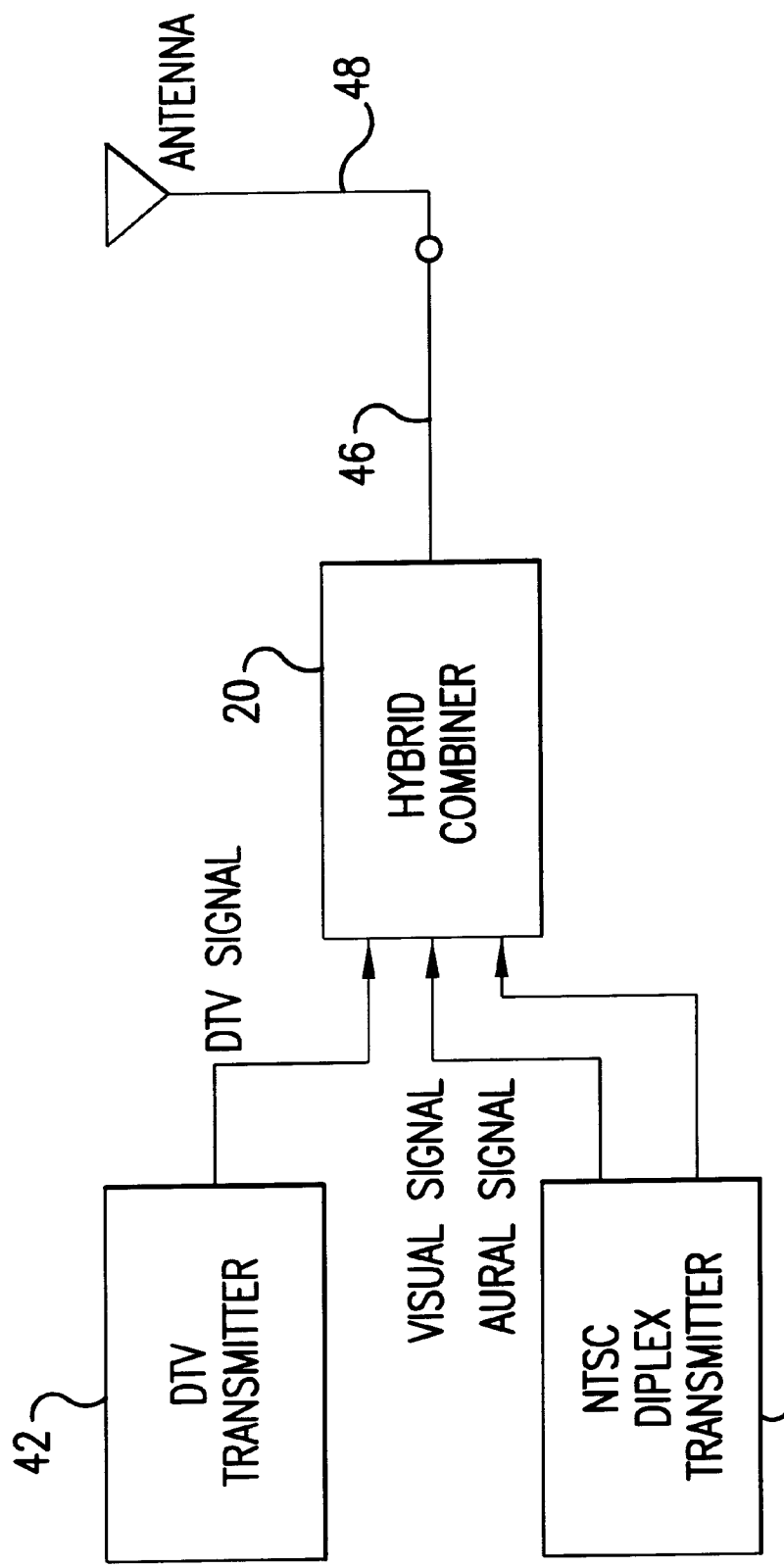
FIG. 4 is a block diagram of a dual DTV/NTSC transmitter system according to the present invention.

Referring to FIG. 2, a dual hybrid diplexer combiner 20 according to one preferred embodiment of the present invention is shown. The first combiner of the dual hybrid combiner is formed by first hybrid HY1, first and second DTV pass/visual signal reject filters 201, 202, and a second hybrid HY2. As shown in FIG. 4, a digital DTV signal is developed by DTV transmitter 42, while separate analog visual and aural signals are developed by NTSC diplex transmitter 44 (transmitter 44 contains separate modulator and amplifier circuitry for the video and audio signals making up the NTSC composite television signal).

Referring back to FIG. 2, the DTV signal is inputted at port 1.1 of hybrid HY1, while port 1.2 of HY1 is terminated in an appropriate characteristic impedance. Ports 1.3 and 1.4 are appropriately loaded so that DTV signal divides equally and appears at output ports 1.3 and 1.4. Filters 201 and 202 are designed to be matched and balanced bandpass filters which pass the DTV signal inputted at port 1.1, but which reject the visual signal inputted at port 2.3. Accordingly, the DTV signals are passed to input ports 2.1 and 2.2 of hybrid HY2. Any out-of-band signal energy appearing at port 1.1 will be reflected by filters 201 and 202 and diverted to port 1.2. The loading of ports 2.3 and 2.4 is designed such that the DTV signals at ports 2.1 and 2.2 will be combined and appear at port 2.4 (with an appropriate delay).

Figure 3:
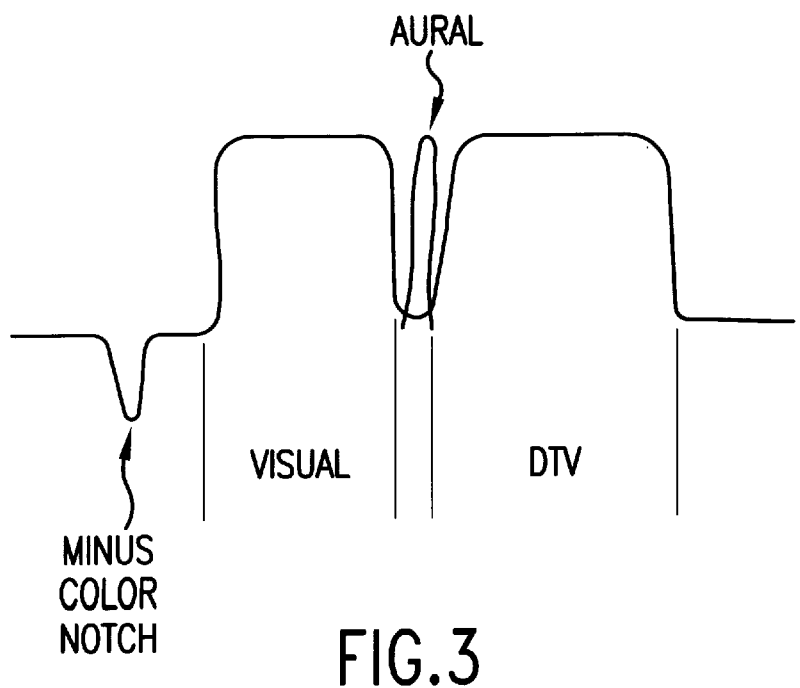
FIG. 3 is a graph showing the combination of DTV and analog television signals according to the invention.

The visual signal is inputted at port 2.3 of hybrid HY2 and is divided equally between ports 2.1 and 2.2. Because of the presence of the balanced visual reject filters 201 and 202, the divided visual signal is reflected from the filters back into hybrid HY2, recombined and appears at output port 2.4. Consequently, both the DTV signal and the visual signal are combined at output port 2.4. As shown in FIG. 3, because no aural signal is present at this juncture, it is possible to combine the NTSC visual signal and the DTV signal (which contains both video and audio information) with a minimum amount of interference or distortion on the adjacent in-band areas as a result of the presence of the unused band where the aural carrier would be. Wideband (6 MHz) filters with sufficient skirt responses formed by loaded components can be used in this regard.

The second combiner is formed of third and fourth hybrids HY3, HY4, minus color notch filters 203, 204 (which are optional and are not required as part of the invention), and aural notch filters 205, 206. The second combiner functions in similar fashion to the first combiner to appropriately combine the DTV/NTSC visual signal pair and the NTSC aural signal. Notch filters 205 and 206 have relatively high Q factors to provide sharp resonance or frequency selectivity of the aural signal as required.

The DTV/NTSC visual signal combination is inputted at port 3.1 of hybrid HY3, while port 3.2 is terminated in an appropriately predetermined characteristic impedance. The combined pair is equally divided and appears at ports 3.3 and 3.4. Minus color notch filters 203 and 204 reject a narrow band corresponding to the minus color burst signal to provide a negative "color notch" as shown in FIG. 3. The DTV/NTSC visual pair then pass through aural notch filters 205 and 206 and are inputted at ports 4.1 and 4.2 of hybrid HY4. As mentioned above, the aural notch filters have relatively high Q factors which provide sharp skirt responses that allow for minimal distortion of the DTV, visual and aural signals.

The NTSC aural signal is inputted at port 4.3 of HY4, equally divided and propagated to ports 4.1 and 4.2, where the divided aural signal is reflected by the aural notch filters 205 and 206 back into HY4, where the divided aural signal is recombined and appears at output port 4.4 along with the DTV/NTSC visual signal pair.

As shown in FIG. 3, the narrow aural signal is inserted in the available band between the DTV signal and the analog visual signal, where appropriate filtering can remove or minimize any interference or distortion.

As shown in FIG. 4, the thus-combined DTV/NTSC composite signal can be outputted on a common transmission line 46 to a common propagation device, such as tower antenna 48 for example.

The invention having been thus described, it will be apparent to those skilled in the art that the same may be varied in many ways without departing from the spirit and scope of the inventions. All such modifications are intended to be encompassed by the following claims.

What is claimed is:

1. Apparatus for combining first and second television signals for propagation on a common propagating device, comprising:

a first hybrid which receives said first television signal at a first port thereof, divides said first television signal into two divided signals and outputs the divided first television signals at second and third ports thereof;

a second hybrid which receives said divided first television signals at first and second ports thereof, receives a first component of said second television signal at a third port thereof, recombines said divided first television signals into a single signal and outputs a combination of said first television signal and said first component of said second television signal at a fourth port thereof;

a third hybrid which receives said combination at a first port thereof, divides said combination into two divided combination signals and outputs the divided combination signals at second and third ports thereof; and a fourth hybrid which receives said divided combination signals at first and second ports thereof, receives a second component of said second television signal at a third port thereof, recombines said divided combination signals into a single combination signal and outputs a combination of said single combination signal and said second component of said second television signal at a fourth port thereof.

2. Apparatus according to claim 1, wherein said first and third hybrids are terminated in predetermined characteristic impedances at respective fourth ports thereof.

3. Apparatus according to claim 1, further comprising bandpass filter means coupled between said first and second hybrids for passing said first television signal and reflecting said first component of said second television signal.

4. Apparatus according to claim 3, further comprising notch filter means coupled between said third and fourth hybrids for reflecting said second component of said second television signal.

5. Apparatus according to claim 4, wherein said first television signal is a DTV (digital television) signal, said second television signal is an NTSC analog signal, said first component of said second television signal is a visual signal, and said second component of said second television signal is an aural signal.

6. Apparatus according to claim 5, wherein said bandpass filter means comprises a DTV pass/visual reject bandpass filter, and said notch filter means comprises an aural notch filter with a relatively high Q factor.

7. Apparatus according to claim 1, further comprising notch filter means coupled between said third and fourth hybrids for reflecting said second component of said second television signal.

8. Apparatus according to claim 1, wherein said first television signal is a DTV (digital television) signal, said second television signal is an NTSC analog signal, said first component of said second television signal is a visual signal, and said second component of said second television signal is an aural signal.

9. Apparatus according to claim 1, wherein said common propagating device comprises a tower antenna.

10. A method for combining a first television signal with a second television signal for transmission to a common propagating device, comprising the steps of:

inputting said first television signal into a first hybrid;

outputting said first television signal from said first hybrid into a second hybrid where it is combined with a first component of said second television signal and outputted as a first combined signal;

inputting the first combined signal into a third hybrid;

outputting the first combined signal from said third hybrid into a fourth hybrid where it is combined with a second component of said second television signal and outputted as a second combined signal to said common propagating device.

11. A method according to claim 10, wherein said first television signal is a DTV (digital television) signal and said second television signal is an NTSC analog composite signal, said first component is a visual signal and said second component is an aural signal.

12. A method according to claim 10, wherein said common propagating device is a tower antenna.

13. A method according to claim 10, further comprising the step of providing bandpass filters between said first and second hybrids to pass said first television signal and to reflect said first component of said second television signal.

14. A method according to claim 10, further comprising the step of providing notch filters between said third hybrid and said fourth hybrid to reflect said second component of said second television signal.

15. A television broadcast system, comprising:

a first transmitter for developing a first television signal;

a second transmitter for developing first and second components of a second television signal;

a dual hybrid combining device for combining said first television signal with said first component to provide a first combined signal, combining said first combined signal with said second component to provide a second combined signal, and outputting said second combined signal; and a common propagation device for receiving said second combined signal and propagating said second combined signal through the atmosphere.

16. A television broadcast system as set forth in claim 15, wherein said first television signal is a DTV (digital television) signal, said second television signal is an NTSC analog composite signal, said first component is a visual signal and said second component is an aural signal.

17. A television broadcast system as set forth in claim 15, wherein said common propagating device is a tower antenna.

18. A television broadcast system as set forth in claim 15, wherein said dual hybrid combining device comprises a plurality of hybrids and a plurality of bandpass filters and notch filters coupled between said plurality of hybrids and arranged in such manner so as to appropriately combine said first television signal with said first and second components of said second television signal with an acceptable amount of interference and/or distortion therebetween.

* * * * *